US008322942B2

(12) United States Patent
Howlett

(10) Patent No.: US 8,322,942 B2
(45) Date of Patent: Dec. 4, 2012

(54) INTERLOCKING CONNECTOR SYSTEM

(75) Inventor: Harold Dean Howlett, Shawnee, KS (US)

(73) Assignee: Howlett Enterprises, LLC, Shawnee, KS (US)

( * ) Notice: Subject to any disclaimer, the term of this patent is extended or adjusted under 35 U.S.C. 154(b) by 245 days.

(21) Appl. No.: 12/411,032

(22) Filed: Mar. 25, 2009

(65) Prior Publication Data

US 2010/0034582 A1 Feb. 11, 2010

Related U.S. Application Data

(60) Provisional application No. 61/086,390, filed on Aug. 5, 2008.

(51) Int. Cl.
*B25G 3/20* (2006.01)
(52) U.S. Cl. .................................................... 403/374.4
(58) Field of Classification Search .................. 403/353, 403/363, 364, 381, 360, 383
See application file for complete search history.

(56) References Cited

U.S. PATENT DOCUMENTS

| | | | |
|---|---|---|---|
| 479,424 A | 7/1892 | Huff et al. | |
| 2,227,712 A | 1/1941 | Hackley | |
| 2,454,681 A | 11/1948 | Wallin | |
| 4,646,497 A * | 3/1987 | Hoenle | 52/285.2 |
| 5,201,109 A | 4/1993 | Harding | |
| 5,406,767 A * | 4/1995 | Pech et al. | 52/638 |
| 5,913,781 A * | 6/1999 | Vidmar et al. | 52/102 |
| 6,138,968 A | 10/2000 | Svantesson et al. | |
| 6,609,679 B1 | 8/2003 | Seidel | |

FOREIGN PATENT DOCUMENTS

GB  2221273 A * 1/1990

* cited by examiner

*Primary Examiner* — Michael P Ferguson
*Assistant Examiner* — Daniel Wiley
(74) *Attorney, Agent, or Firm* — Jeffrey L. Thompson; Thompson & Thompson, P.A.

(57) ABSTRACT

A connector system includes two connector members that can each be mounted to separate objects and then interlocked together to attach the two objects together. In one embodiment, the two connector members are identical and interchangeable with each other. In other embodiments, the two connector members are arranged to attach together objects having perpendicular mounting surfaces or coplanar mounting surfaces. The connector members include an alignment structure having a projection positioned between a first pair of inclined surfaces, and a receiver structure positioned between a second pair of inclined surfaces. The connector members are interlocked together by mating the alignment structure of one connector member with the receiver structure of the other connector member. The relative movement between the connector members causes the inclined surfaces of one connector member to wedge against the inclined surfaces of the other connector member to form a tight and strong connection.

8 Claims, 16 Drawing Sheets

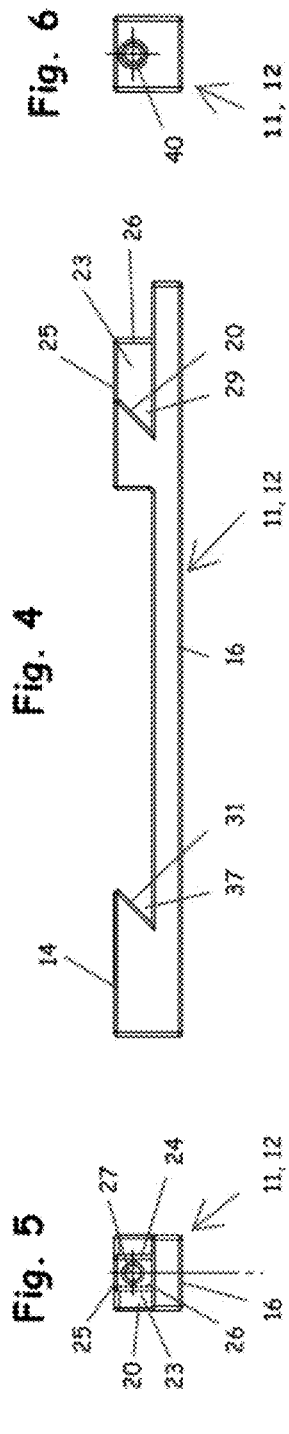
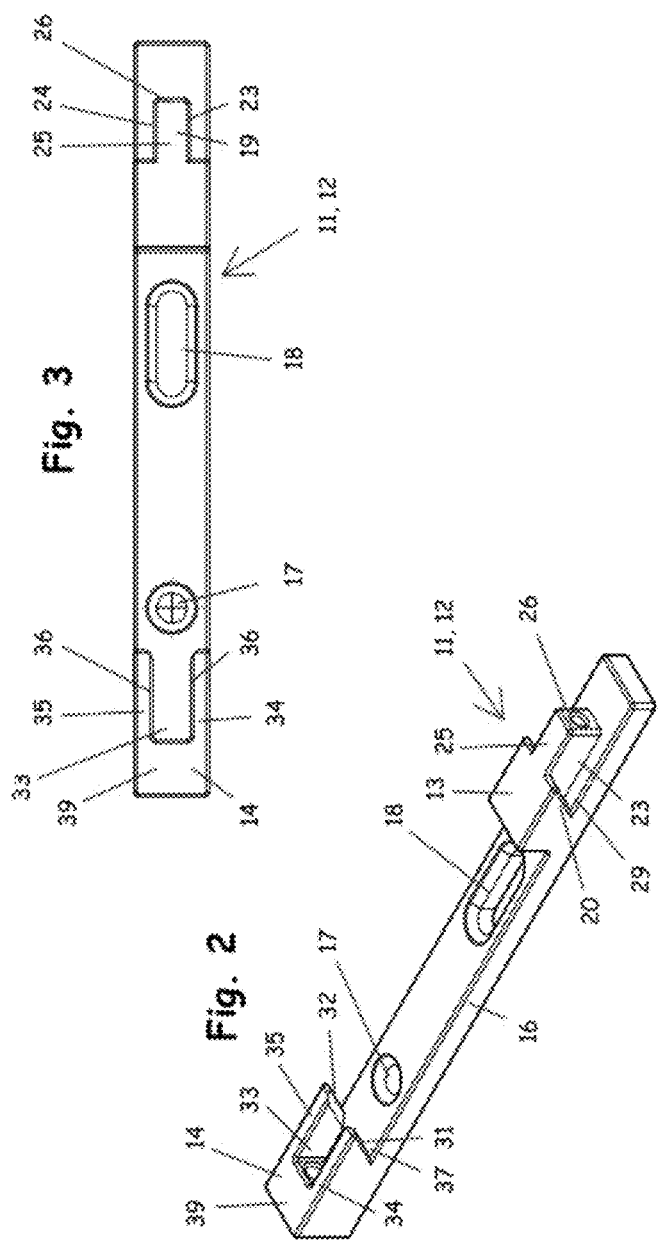

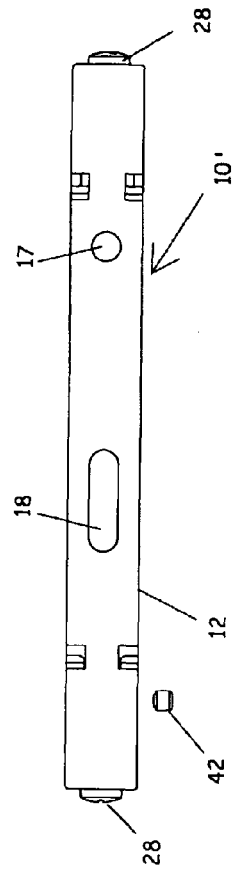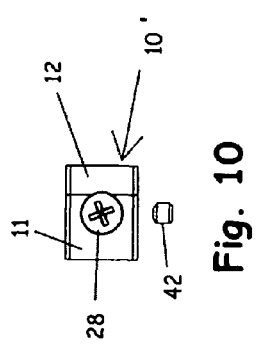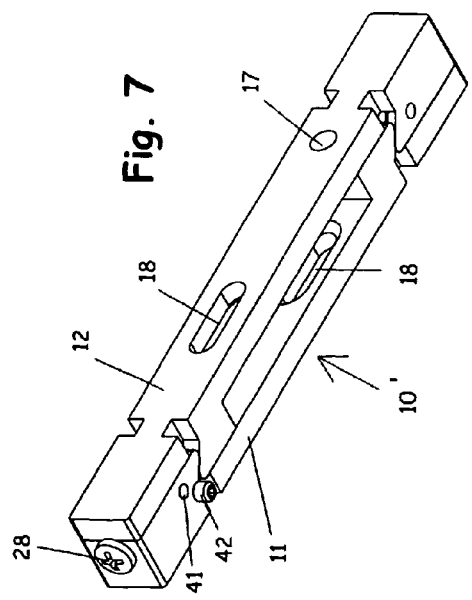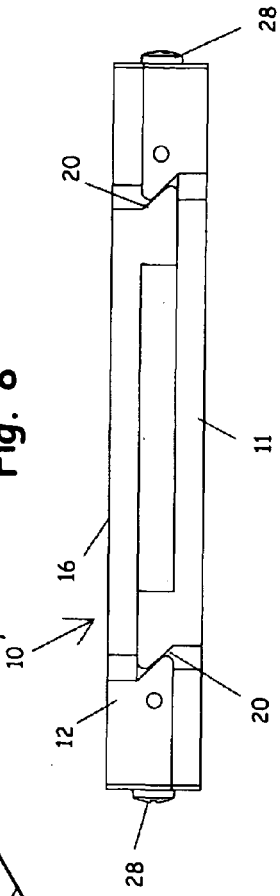

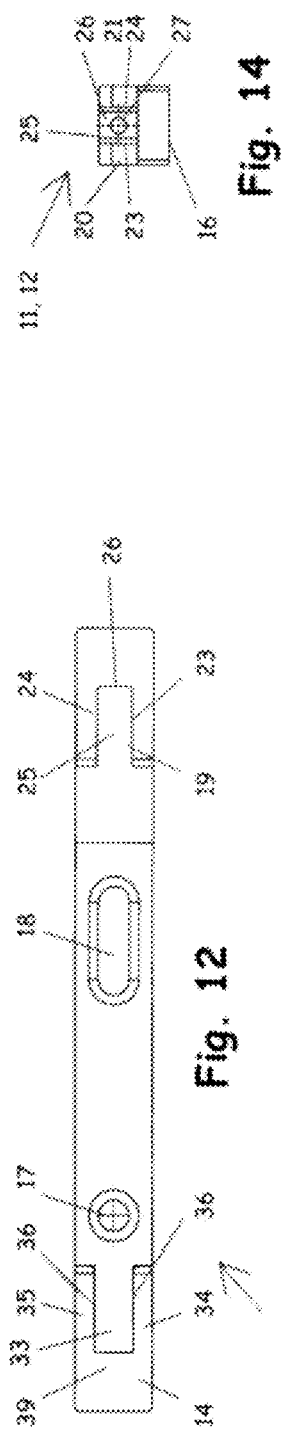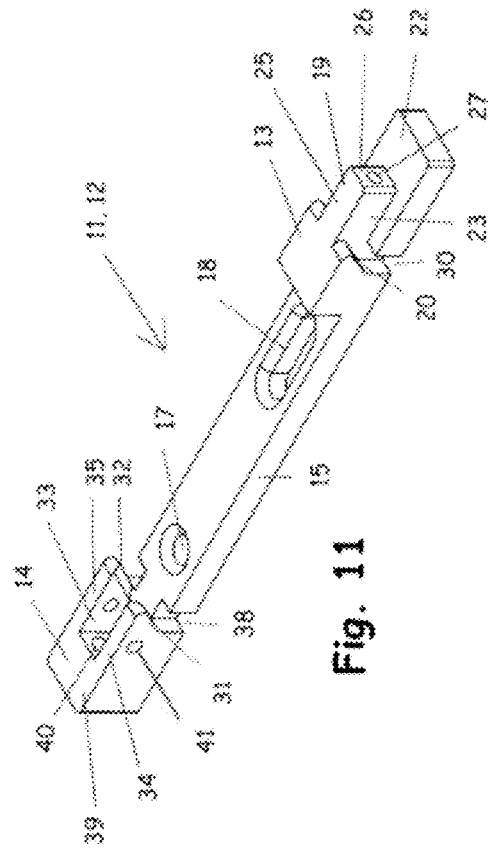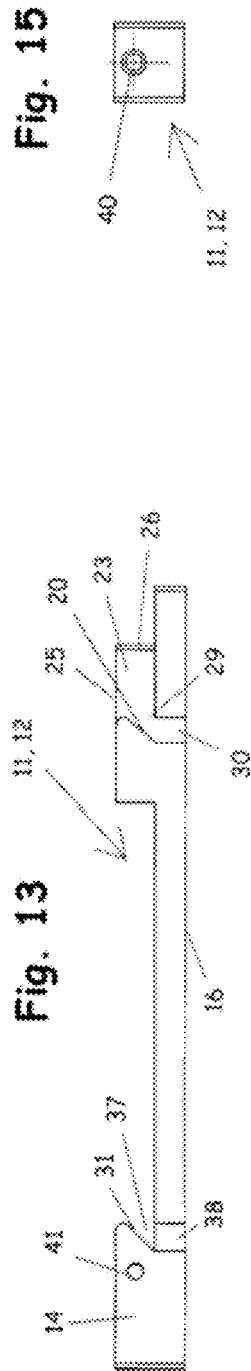

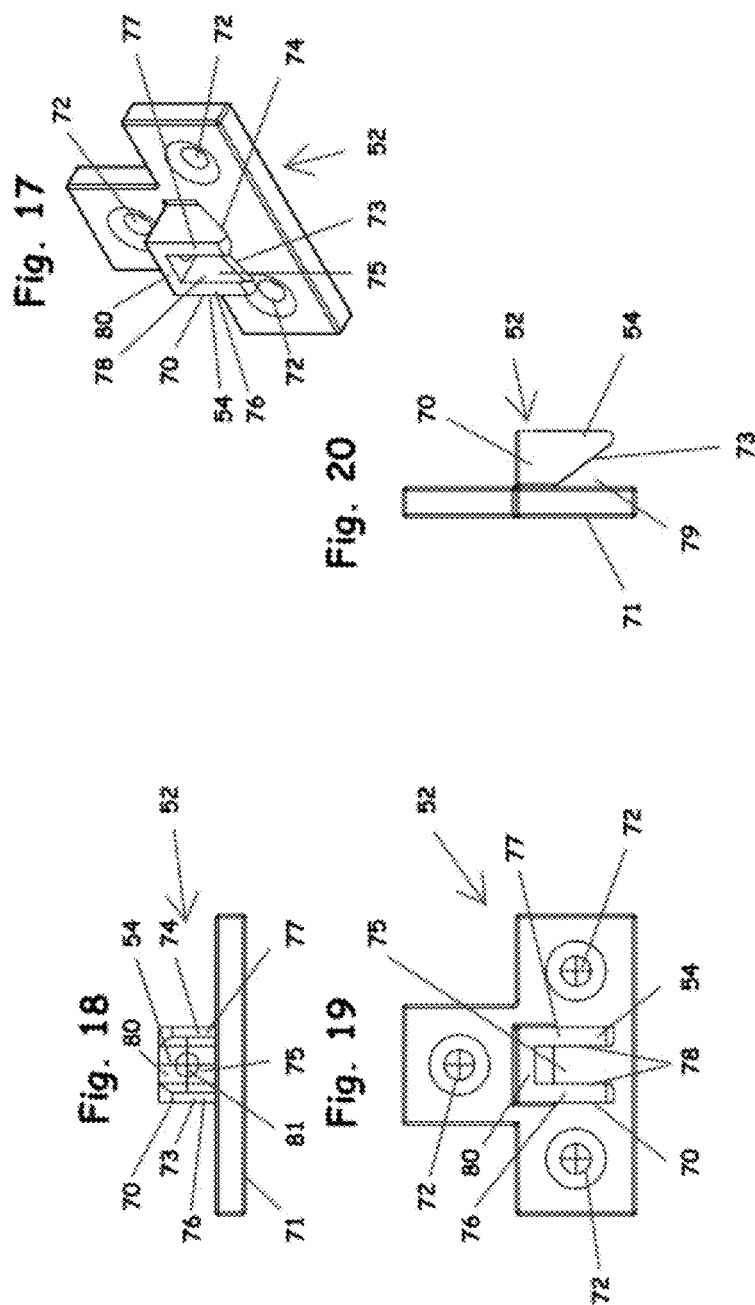

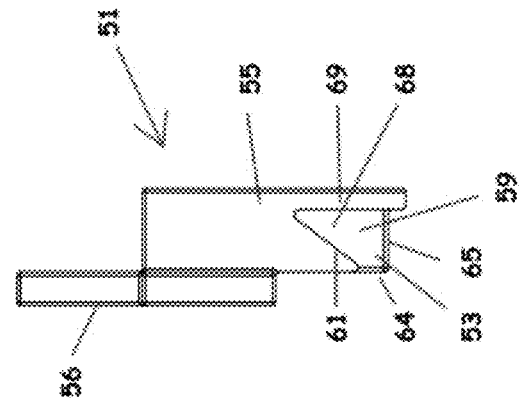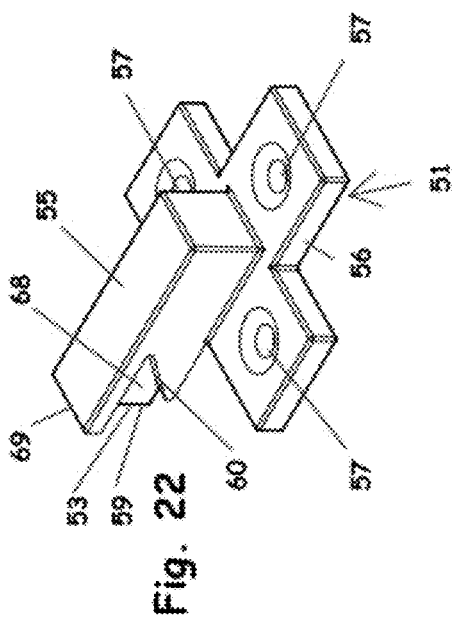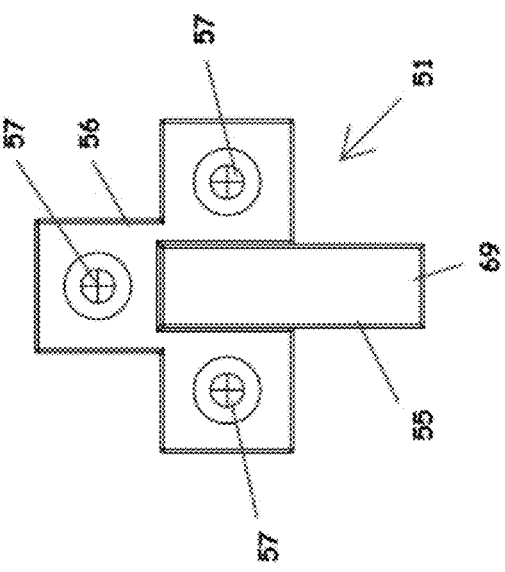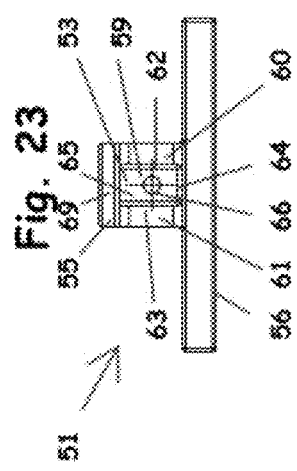

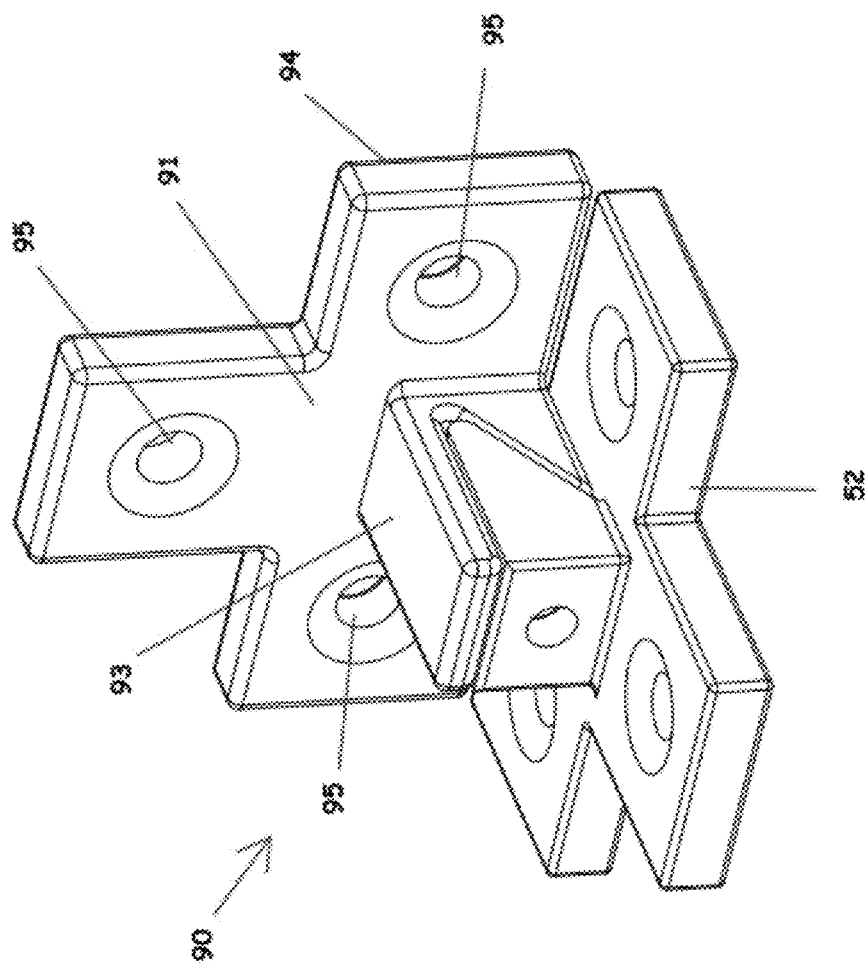

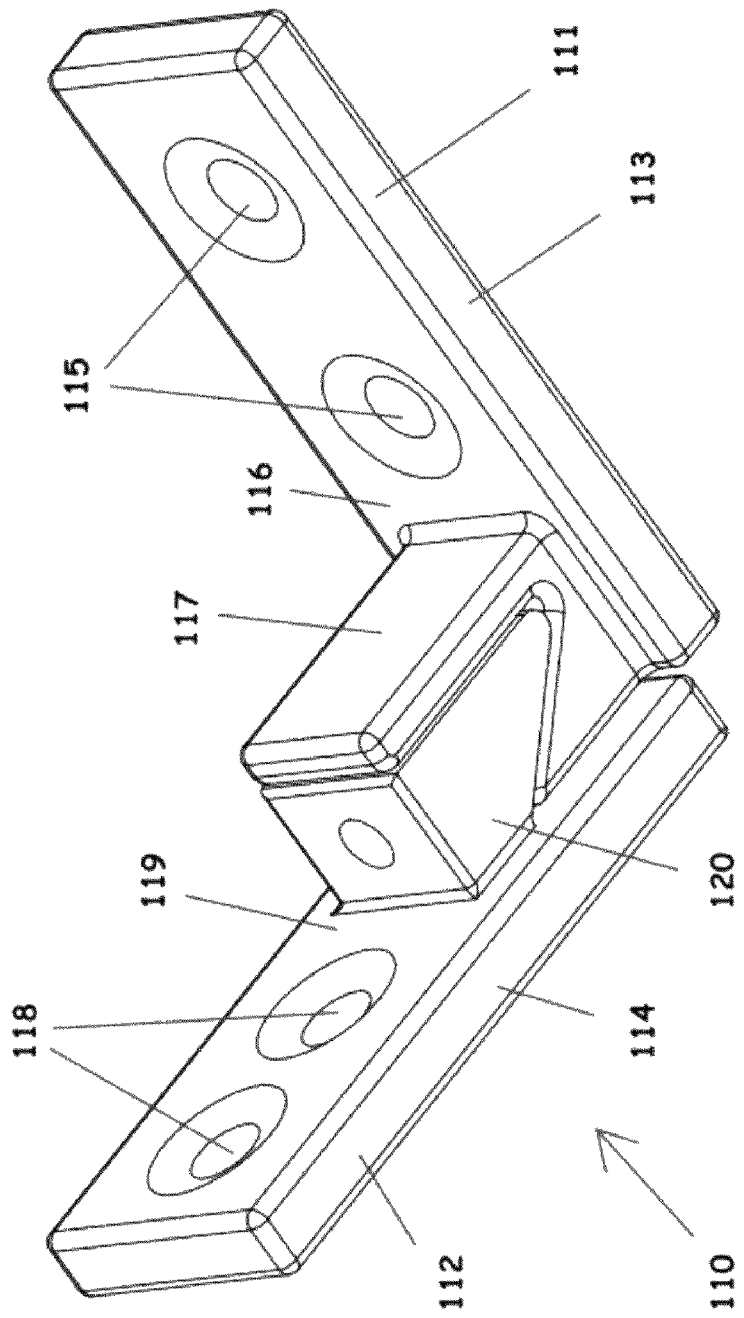

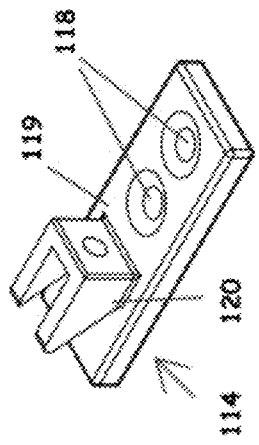
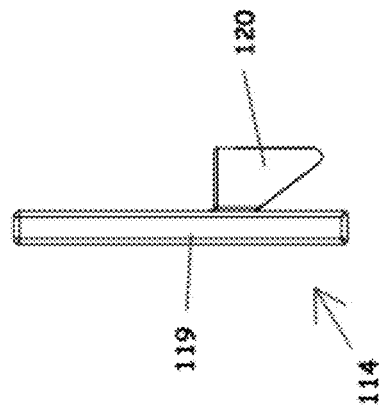
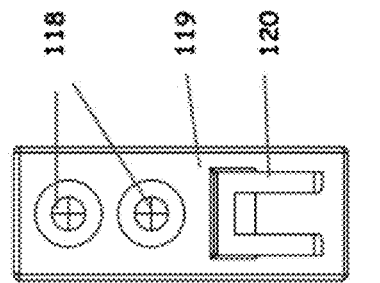
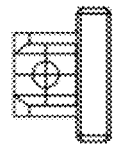

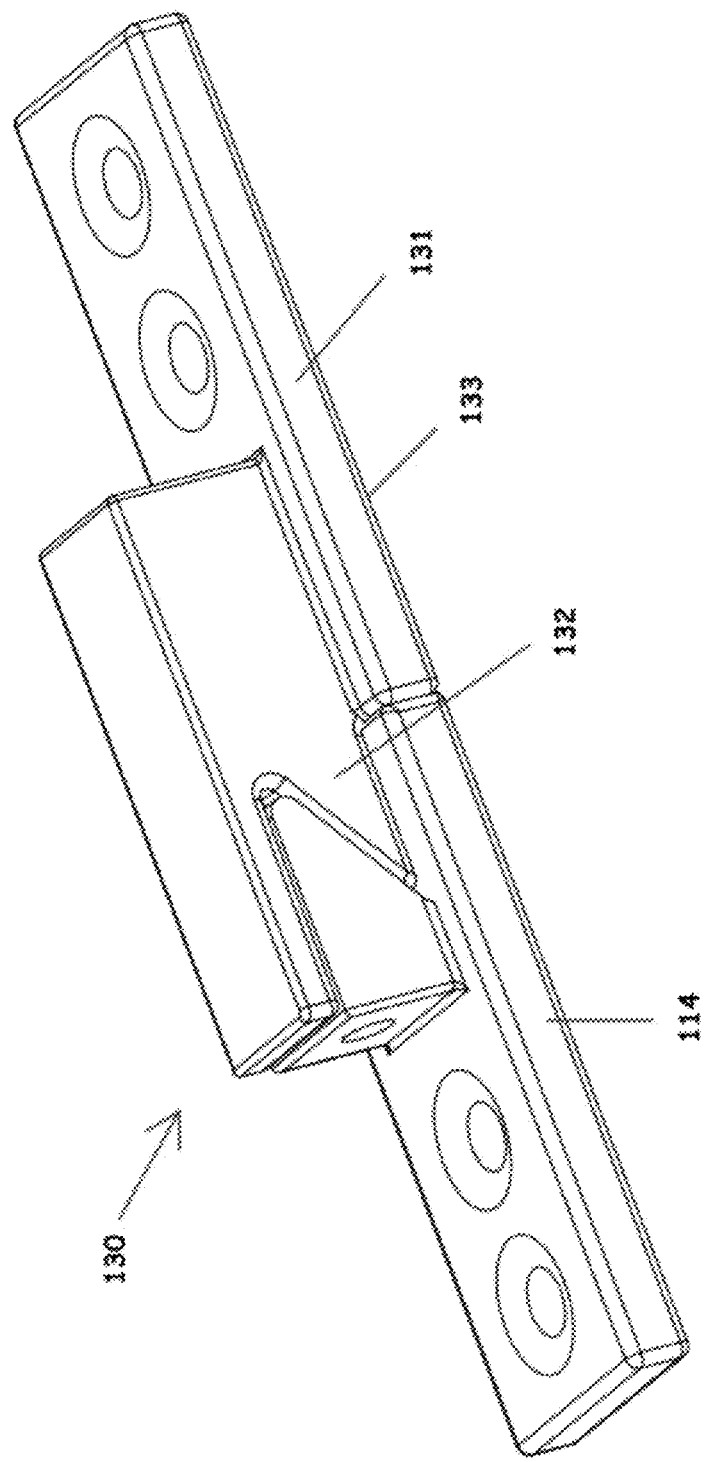

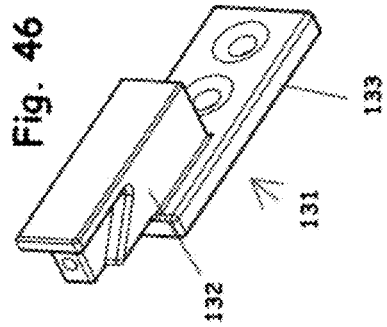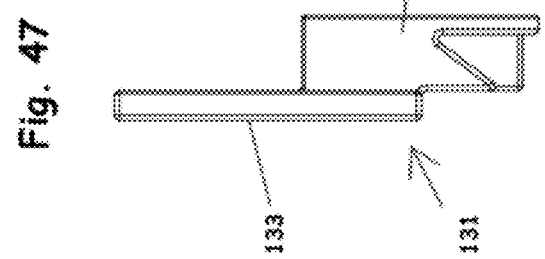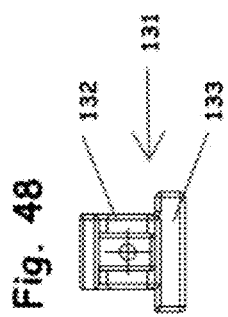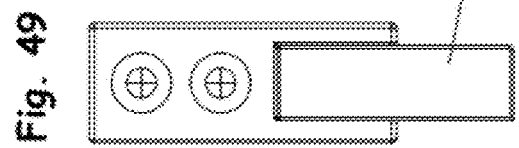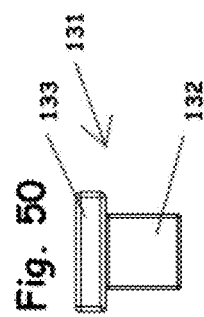

INTERLOCKING CONNECTOR SYSTEM

RELATED APPLICATIONS

This application claims priority of U.S. Provisional Application No. 61/086,390 filed on Aug. 5, 2008. The content of this prior application is incorporated herein by reference.

BACKGROUND OF THE INVENTION

1. Field of the Invention

The present invention relates generally to connectors to attaching objects together, and in particular to an interlocking connector system that can be mounted to separate objects and then interlocked together to attach the objects together.

2. Description of the Related Art

Many techniques exist in the prior art for attaching objects together. For example, screws, nails, dowels, and bolts have been used to attach objects together, such as furniture components, shelves, book cases, etc. However, these fastening techniques have often been difficult and time consuming to use, particularly by unskilled consumers or furniture retailers who purchase items that must be assembled after shipment. The use of screws by furniture installers often results in "screw run through," which can severely damage the furniture.

While some of the problems of using traditional fasteners have been addressed in the prior art by using various brackets, the existing bracket designs have also had problems. For example, conventional brackets are difficult to conceal and/or lack sufficient structural integrity after assembly to securely tighten joints or to allow the attached items to be moved without damaging the connection.

U.S. Pat. No. 6,138,968 (Svantesson et al.) discloses a system for releaseably attaching a unit to an attachment surface. This system includes two separate members, with each member being separately fastened by screws to an attachment surface or to a unit to be attached to the surface. The system includes a plurality of wedge structures at spaced locations for interlocking the unit to the attachment surface. However, this system cannot be easily concealed in an item of furniture and would be difficult for some users to obtain perfect alignment between the objects being connected.

U.S. Pat. No. 6,609,679 (Seidel) discloses a component mounting system that includes a pair of mating parts having mating linear wedge-type ramps at spaced locations. However, these mating parts are incorporated into the components being mounted together, and are not provided as a separate mounting system that can be attached by screws to furniture parts, etc.

There remains a need in the industry for improvements in connector systems for attaching objects together.

SUMMARY OF THE INVENTION

An object of the present invention is to provide a connector system that solves the problems with the conventional connectors and fastening systems described above.

A further object of the present invention is to provide an interlocking connector system that has the ability to tighten joints without mechanical clamps, that can be concealed as a straight bracket, that allows for easy disassembly and reassembly, that has sufficient structural integrity to allow relocation of case goods without disassembly, that does not require power tools for assembly after the bracket members are installed, that allows case goods to be shipped unassembled to reduce the cost of freight, and that can be easily assembled to reduce the cost of labor.

A further object of the present invention is to provide an interlocking connector system that can be used for a wide variety of applications, including the assembly of wood case goods, the assembly of drawers, the attachment of wall-mounted shelves, the attachment of wall mount cantilevers, the attachment of wall-mounted cabinet and storage units, and the attachment of wall-mounted panels.

To accomplish these and other objects of the invention, an interlocking connector system is provided that includes two connector members that can each be mounted to separate objects and then interlocked together to attach the two objects together. In one embodiment, the two connector members are identical and interchangeable with each other. In other embodiments, the two connector members are arranged to attach together objects having perpendicular mounting surfaces or coplanar mounting surfaces. The connector members include an alignment structure having a projection positioned between a first pair of inclined surfaces, and a receiver structure positioned between a second pair of inclined surfaces. The connector members are interlocked together by mating the alignment structure of one connector member with the receiver structure of the other connector member. The relative movement between the connector members causes the inclined surfaces of one connector member to wedge against the inclined surfaces of the other connector member. A threaded fastener extends between the connector members and is arranged to draw the connector members together with the inclined surfaces wedged against each other to create a tight and strong connection.

According to a broad aspect of the invention, an interlocking connector system is provided, comprising: a first connector member having an alignment structure positioned between a first pair of inclined surfaces; and a second connector member having a receiver structure positioned between a second pair of inclined surfaces, the receiver structure being arranged to mate with the alignment structure when the first and second connector members are assembled together, and the first pair of inclined surfaces are arranged to wedge against the second pair of inclined surfaces when the alignment structure is mated with the receiver structure.

According to another aspect of the present invention, an interlocking connector system is provided, comprising: a first connector member having an alignment structure positioned between a first pair of inclined surfaces, a receiver structure positioned between a second pair of inclined surfaces, and an elongate body extending between the alignment structure and the receiver structure; a second connector member which is substantially identical to the first connector member with an alignment structure positioned between a first pair of inclined surfaces, a receiver structure positioned between a second pair of inclined surfaces, and an elongate body extending between the alignment structure and the receiver structure; the first and second connector members being arranged to interlock together by simultaneously mating the alignment structure of the first connector member with the receiver structure of the second connector member and the alignment structure of the second connector member with the receiver structure of the first connector member; the first pair of inclined surfaces of the first connector member are arranged to wedge against the second pair of inclined surfaces of the second connector member when the alignment structure of the first connector member is mated with the receiver structure of the second connector member; and the first pair of inclined surfaces of the second connector member are arranged to wedge against the second pair of inclined surfaces of the first connector member when the alignment structure of the second connector member is mated with the receiver structure of the first connector member.

Numerous other objects and features of the present invention will be apparent to those skilled in this art from the following description wherein there is shown and described embodiments of the present invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the present invention is made with reference to the accompanying drawings. In the drawings:

FIG. 2 is a perspective view of one of the connector members used in the connector system shown in FIG. 1.

FIG. 3 is a plan view of the connector member shown in FIG. 1.

FIG. 4 is a side view of the connector member shown in FIG. 1.

FIG. 5 is a front end view of the connector member shown in FIG. 1.

FIG. 6 is a rear end view of the connector member shown in FIG. 1.

FIG. 7 is a perspective view of two connector members interlocked together according to a second embodiment of the present invention.

FIG. 8 is a side view of the interlocked connector members shown in FIG. 7.

FIG. 9 is a plan view of the interlocked connector members shown in FIG. 7.

FIG. 10 is an end view of the interlocked connector members shown in FIG. 7.

FIG. 11 is a perspective view of one of the connector members used in the connector system shown in FIGS. 7 to 10.

FIG. 12 is a plan view of the connector member shown in FIG. 11.

FIG. 13 is a side view of the connector member shown in FIG. 11.

FIG. 14 is a front end view of the connector member shown in FIG. 11.

FIG. 15 is a rear end view of the connector member shown in FIG. 11.

FIG. 17 is a perspective view of one of the connector members used in the connector system shown in FIG. 16.

FIG. 18 is a front end view of the connector member shown in FIG. 17.

FIG. 19 is a plan view of the connector member shown in FIG. 17.

FIG. 20 is a side view of the connector member shown in FIG. 17.

FIG. 21 is a rear end view of the connector member shown in FIG. 17.

FIG. 22 is a perspective view of another one of the connector members used in the connector system shown in FIG. 16.

FIG. 23 is a front end view of the connector member shown in FIG. 22.

FIG. 24 is a plan view of the connector member shown in FIG. 22.

FIG. 25 is a side view of the connector member shown in FIG. 22.

FIG. 26 is a perspective view of two connector members interlocked together according to a fourth embodiment of the present invention.

FIG. 31 is a perspective view of two connector members interlocked together according to a fifth embodiment of the present invention.

FIG. 36 is a perspective view of another one of the connector members used in the connector system shown in FIG. 31.

FIG. 37 is a front end view of the connector member shown in FIG. 36.

FIG. 38 is a plan view of the connector member shown in FIG. 36.

FIG. 39 is a side view of the connector member shown in FIG. 36.

FIG. 45 is a perspective view of two connector members interlocked together according to a seventh embodiment of the present invention.

FIG. 46 is a perspective view of one of the connector members used in the connector system shown in FIG. 45.

FIG. 47 is a side view of the connector member shown in FIG. 46.

FIG. 48 is a front end view of the connector member shown in FIG. 46.

FIG. 49 is a plan view of the connector member shown in FIG. 46.

FIG. 50 is a rear end view of the connector member shown in FIG. 46.

DETAILED DESCRIPTION OF THE INVENTION

Figure 1:
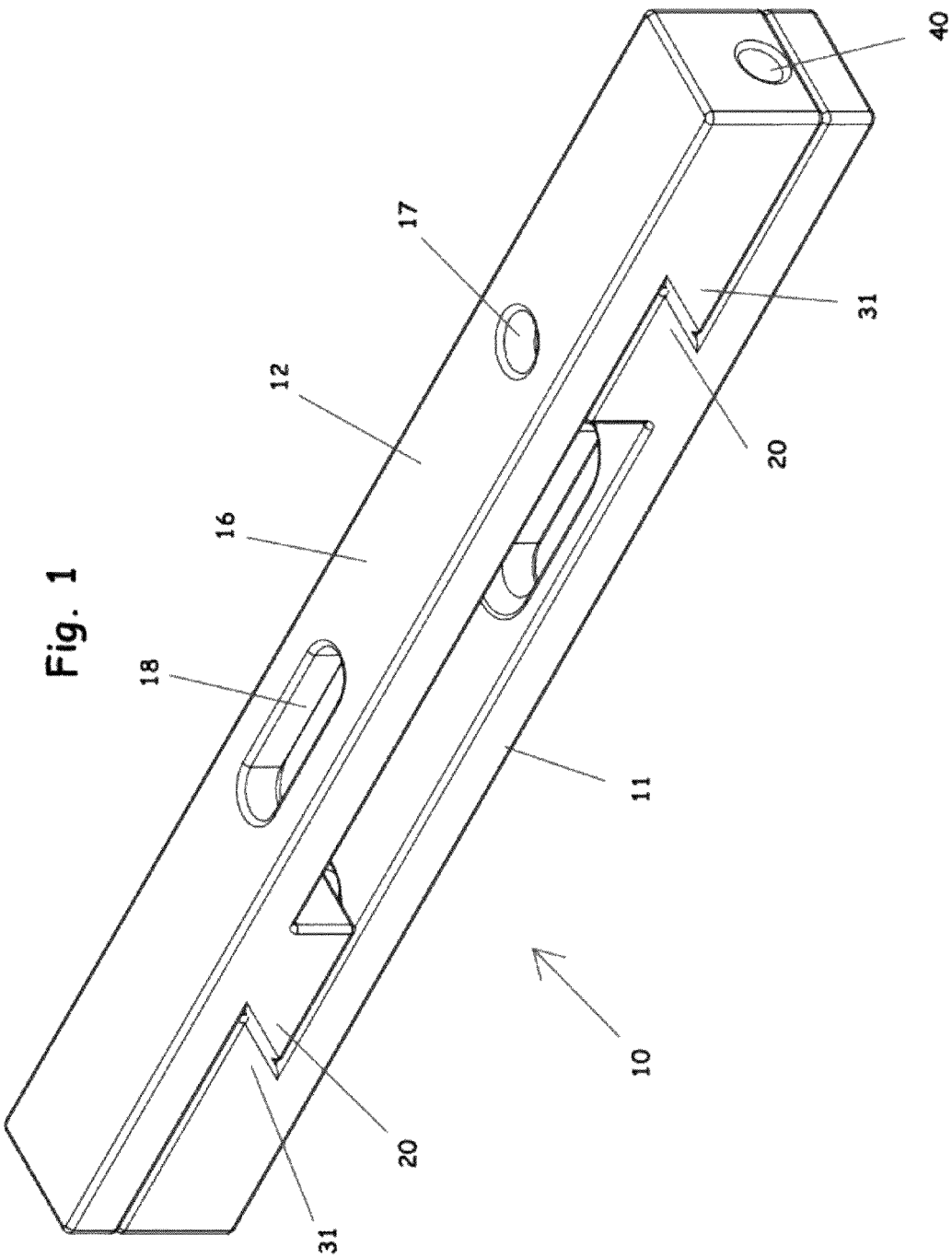
FIG. 1 is a perspective view of two connector members interlocked together according to the first embodiment of the present invention.

An interlocking connector system according to various embodiments of the present invention will now be described in detail with reference to FIGS. 1 to 50 of the accompanying drawings.

An interlocking connector system 10 according to the first embodiment is shown in FIGS. 1 to 6. The connector system 10 of this embodiment includes a first connector member 11 and a second connector member 12 that can each be mounted to separate objects and then interlocked together to attach the two objects together. The first and second connector members 11, 12 are identical and interchangeable with each other.

The connector members 11, 12 each have an alignment structure 13 at one end, and a receiver structure 14 at the other end. An elongate body 15 extends between the alignment structure 13 and the receiver structure 14. The elongate body 15 has a substantially flat mounting surface 16 on a backside for engaging an object on which the connector member 11, 12 is mounted. At least one, and preferably a plurality of, mounting openings 17, 18 are provided in the elongate body for receiving threaded fasteners or the like (not shown) to secure the connector member 11, 12 to an object. At least one of the mounting openings 18 can be an elongated slot to facilitate positioning and connecting the member 11, 12 to an object.

The alignment structure 13 has a projection 19 positioned between a first pair of inclined surfaces 20, 21. The projection 19 is a generally rectangular prism-shaped element formed integral with and extending from the upper surface 22 of the elongate body 15. The projection 19 has a pair of substantially parallel outer sidewalls 23, 24, a generally flat upper wall 25, and a front wall 26. A bore 27 is formed through the end wall 26 of the projection 19 for receiving a threaded faster 28, as explained below.

The first pair of inclined surfaces 20, 21 are located adjacent to and outside of the respective outer sidewalls 23, 24 of the projection 19. The inclined surfaces 20, 21 each lie in a plane that extends generally perpendicular to the sidewalls 23, 24 of the projection 19. The inclined surfaces 20, 21 are sloped downwardly and rearwardly to form a wedge-shaped opening 29 between the inclined surfaces 20, 21 and the upper surface 15 of the elongate body.

The receiver structure 14 is positioned between a second pair of inclined surfaces 31, 32. The receiver structure 14 comprises a receptacle 33 formed between a pair of substantially parallel walls 34, 35 extending from the upper surface 22 of the elongate body 15. The walls 34, 35 have inner surfaces 36 arranged to engage the outer sidewalls 23, 24 of the projection 19 when the first and second connector members 11, 12 are assembled together.

The second pair of inclined surfaces 31, 32 are formed integral with the parallel walls 34, 35, and are located adjacent to and outside of the respective inner surfaces 36 of the walls 34, 35. The inclined surfaces 31, 32 are sloped downwardly and rearwardly to form a wedge-shaped opening 37 between the inclined surfaces 31, 32 and the upper surface 22 of the elongate body 15. Egress openings 38 are formed in the body 15 adjacent to each side of the receptacle 33 to allow dust and other particles to pass through without interfering with the connection.

An end wall 39 is formed between the parallel sidewalls 34, 35 of the receiver structure 14. A bore 40 is formed through the end wall of the receiver structure 14 for receiving a threaded fastener 28, as explained below.

The first and second connector members 11, 12 can be interlocked together, as shown in FIG. 1, by simultaneously mating the alignment structures 13 and the receiver structures 14 of the connector members 11, 12. Specifically, the alignment structure 13 of the first connector member 11 is mated with the receiver structure 14 of the second connector member 12, and the alignment structure 13 of the second connector member 12 is mated with the receiver structure 14 of the first connector member 11. The first and second connector members 11, 12 are interlocked together by aligning the respective alignment 13 and receiver structures 14, and then moving the first and second connector members 11, 12 relative to each other in a substantially linear direction. The relative movement between the first and second connector members 11, 12 causes the first pair of inclined surfaces 20, 21 of the first connector member 11 to wedge against the second pair of inclined surfaces 31, 32 of the second connector member 12, and also causes the first pair of inclined surfaces 20, 21 of the second connector member 12 to wedge against the second pair of inclined surfaces 31, 32 of the first connector member 11.

A threaded fastener 28 is inserted through the bore 40 in the end wall 39 of the receiver structure 14 into the bore 27 in the end wall 26 of the alignment structure 13. The threaded fastener 28 is used to draw the connector members 11, 12 together in the linear direction to create a tight connection. A second threaded fastener 28 can be inserted through the bores 40, 27 at the other end of the connector system.

When the first and second connector members 11, 12 are assembled and interlocked together, as shown in FIG. 1, the respective mounting surfaces 16 of the connector members 11, 12 are substantially parallel with each other. This allows the connector members 11, 12 to be used to connect two objects together having parallel mounting surfaces.

A connector system 10' according to a second embodiment is shown in FIGS. 7 to 15. The connector system 10' is similar to the connector system 10 shown in FIGS. 1 to 6, and therefore the same reference numerals have been used to designate the elements that are substantially the same in each embodiment. In addition to the common elements described above, the connector system 10' also includes egress openings 30 formed in the body 15 adjacent each side of the projection 19 to allow dust and other particles to pass through without interfering with the connection. The connector system 10 also has one or more bores 41 formed in the sidewalls 34, 35 of the receiver structure 14 for receiving one or more threaded set screws 42. The set screws 42 can be used in the bores 41 to anchor the assembled connector members 11, 12 together.

The interlocking connector systems 10 and 10' described above can be used to connect various objects together. For example, two panels of a desk or other item of furniture can be secured together using one or more pairs of the first and second connector members 11, 12. The first connector member 11 is attached to one panel of the desk, and the second connector member 12 is attached to another panel of the desk. The panels can then be shipped in an unassembled condition, and assembled easily and efficiently by interlocking the connector members 11, 12 together. An H-shaped track or other suitable trim piece can be used on one or both of the panels to conceal the connector members 11, 12 after assembly. The H-shaped track can also enhance the strength of the panel and help insure proper alignment of the connector members 11, 12. Alternatively, a slot can be routed into one of the panels for accommodating the connector members 11, 12.

In another example, a shelf can be attached to a wall using the connector members 11, 12. The first connector member 11 is attached to the wall with the end wall 26 of the projection 19 facing upwardly, and the second connector member 12 is attached to a shelf bracket. Another pair of first and second connector members 11, 12 can be used to attach a second shelf bracket. The shelf brackets can then be easily attached to the wall by interlocking the respective connector members 11, 12 together. A threaded screw 28 can then be inserted through the top ends of the interlocked connector members 11, 12 to secure the connector members 11, 12 together. A set screw 42 can be used to further anchor the connector members 11, 12 together.

Additional connector members 11, 12 can be used to attach a shelf to the shelf brackets. A variety of other cantilevers and work surfaces can also be assembled using the connector systems 10 and 10' of the present invention. For example, the connector systems 10 and 10' can be used to secure a hanging book case, a curio shelf, a towel rack or a multi-bar plan rack to a wall. The connector systems 10 and 10' can also be used in connection with a wall bracket for holding candles and electric light fixtures.

An interlocking connector system 50 according to a third embodiment is shown in FIGS. 16 to 25. The connector system 50 of this embodiment incorporates some of the same features as the connector system 10 of the first embodiment. However, the connector system 50 can be used to attach two objects having substantially coplanar mounting surfaces.

The connector system 50 includes a first connector member 51 (FIGS. 22 to 25) and a second connector member 52 (FIGS. 17 to 21) that can each be mounted to separate objects and then interlocked together to attach the two objects together. The first and second connector members 51, 52 are not identical in this embodiment. Instead, the first connector member 51 has an alignment structure 53, while the second connector member 52 has a receiver structure 54.

The first connector member 51 has a body 55 with a substantially flat mounting structure 56 on a backside that defines a mounting surface for engaging an object on which the first connector member 51 is mounted. At least one, and preferably a plurality of, mounting openings 57 are provided in the body 55 for receiving threaded fasteners or the like (not shown) to secure the first connector member 51 to the object.

The alignment structure 53 on the first connector member 51 has a projection 59 positioned between a first pair of inclined surfaces 60, 61. The projection 59 is a generally rectangular prism-shaped element formed integral with and extending from the front end of the body 55. The projection 59 has a pair of substantially parallel outer sidewalls 62, 63, a generally flat wall 64 extending between the sidewalls 62, 63, and a front end wall 65. A bore 66 is formed through the end wall 65 for receiving a threaded faster (not shown), as explained below.

The first pair of inclined surfaces 60, 61 are located adjacent to and outside of the respective outer sidewalls 62, 63 of the projection 59. The inclined surfaces 60, 61 each lie in a plane that extends generally perpendicular to the sidewalls 62, 63 of the projection 59. The inclined surfaces 60, 61 are sloped downwardly and rearwardly to form a wedge-shaped opening 68 between the inclined surfaces 60, 61 and a protruding portion 69 of the body 55.

The second connector member 52 (FIGS. 17 to 21) has a body 70 with a substantially flat mounting structure 71 on a backside that defines a mounting surface for engaging an object on which the second connector member 52 is mounted. At least one, and preferably a plurality of, mounting openings 72 are provided in the body 70 for receiving threaded fasteners or the like (not shown) to secure the second connector member 52 to the object.

The receiver structure 54 on the second connector member 52 is positioned between a second pair of inclined surfaces 73, 74. The receiver structure 54 comprises a receptacle 75 formed between a pair of substantially parallel walls 76, 77 extending from the upper surface of the body 70. The walls 76, 77 have inner surfaces 78 arranged to engage the outer sidewalls 62, 63 of the projection 59 when the first and second connector members 51, 52 are assembled together.

The second pair of inclined surfaces 73, 74 are formed integral with the parallel walls 76, 77, and are located adjacent to and outside of the respective inner surfaces 78 of the walls 76, 77. The inclined surfaces 73, 74 are sloped downwardly and rearwardly to form a wedge-shaped opening 79 between each of the inclined surfaces 73, 74 and the upper surface of the body 70 of the second connector member 52. An end wall 80 is formed between the parallel sidewalls 76, 77. A bore 81 is formed through the end wall 80 of the receiver structure 54 for receiving the threaded fastener (not shown), as explained below.

Figure 16:
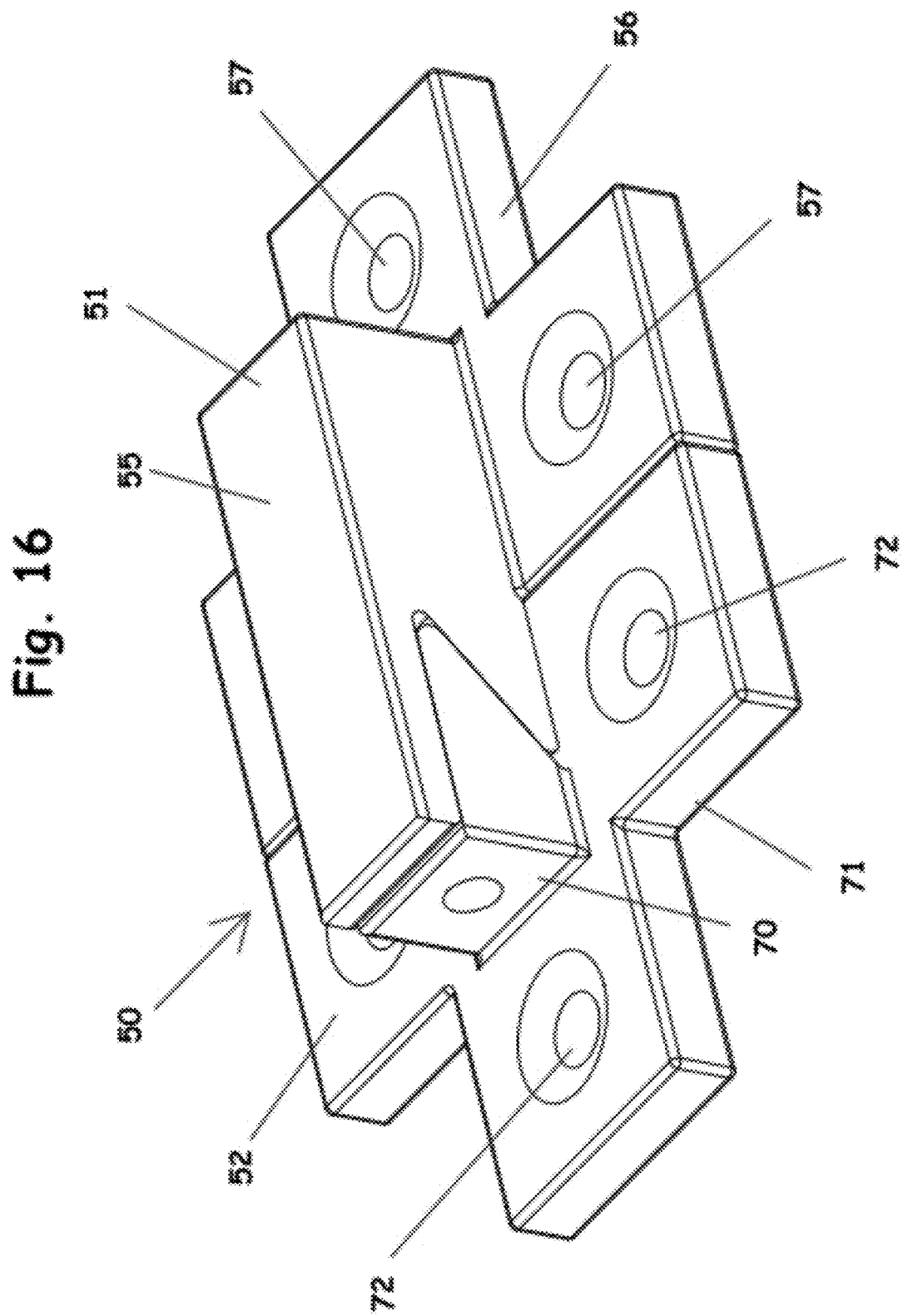
FIG. 16 is a perspective view of two connector members interlocked together according to a third embodiment of the present invention.
Figure 28:
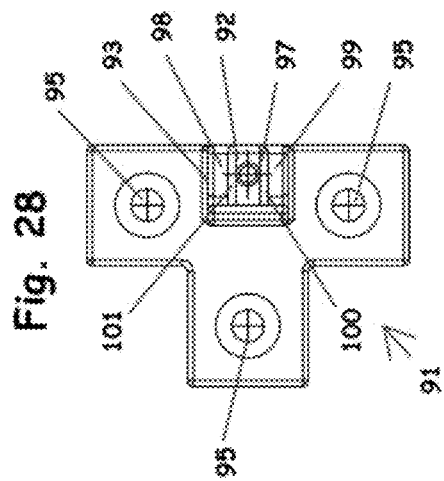
FIG. 28 is a plan view of the connector member shown in FIG. 27.
Figure 30:
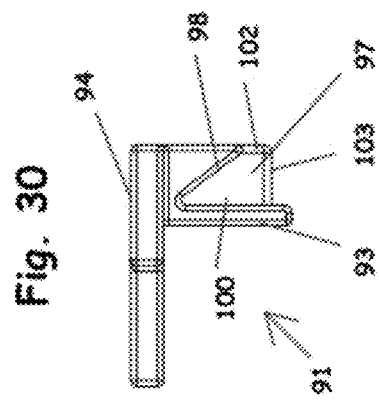
FIG. 30 is a side view of the connector member shown in FIG. 27.
Figure 27:
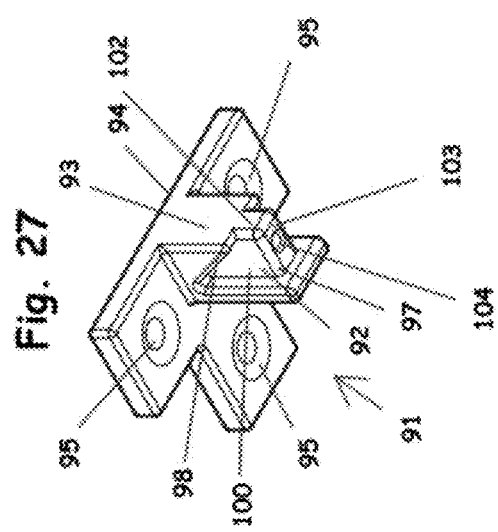
FIG. 27 is a perspective view of one of the connector members used in the connector system shown in FIG. 26.
Figure 29:
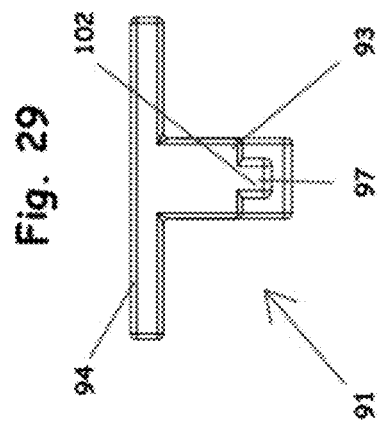
FIG. 29 is an end view of the connector member shown in FIG. 27.
Figure 32:
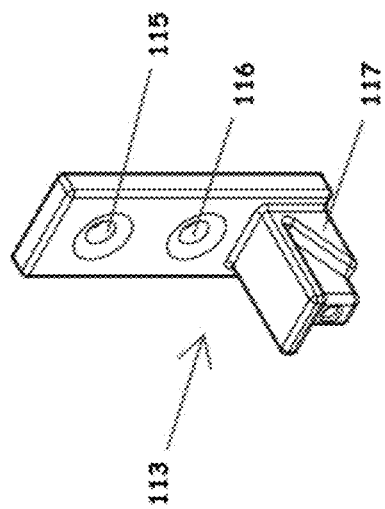
FIG. 32 is a perspective view of one of the connector members used in the connector system shown in FIG. 31.
Figure 35:
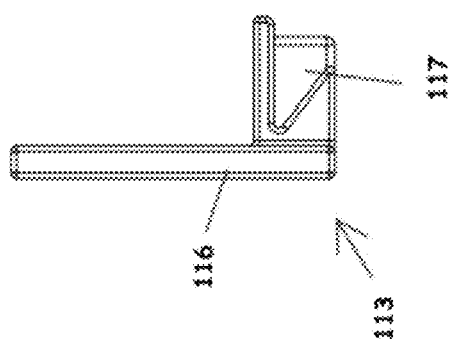
FIG. 35 is a side view of the connector member shown in FIG. 32.
Figure 33:
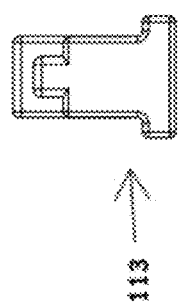
FIG. 33 is a front end view of the connector member shown in FIG. 32.
Figure 34:
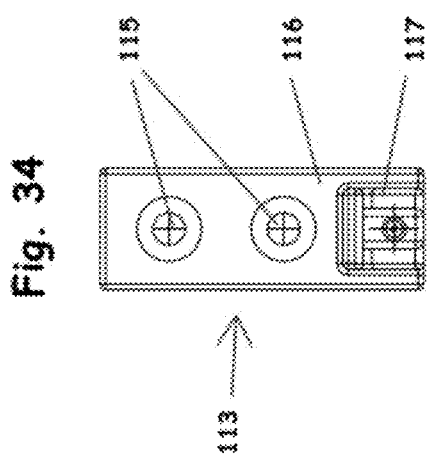
FIG. 34 is a plan view of the connector member shown in FIG. 32.
Figure 40:
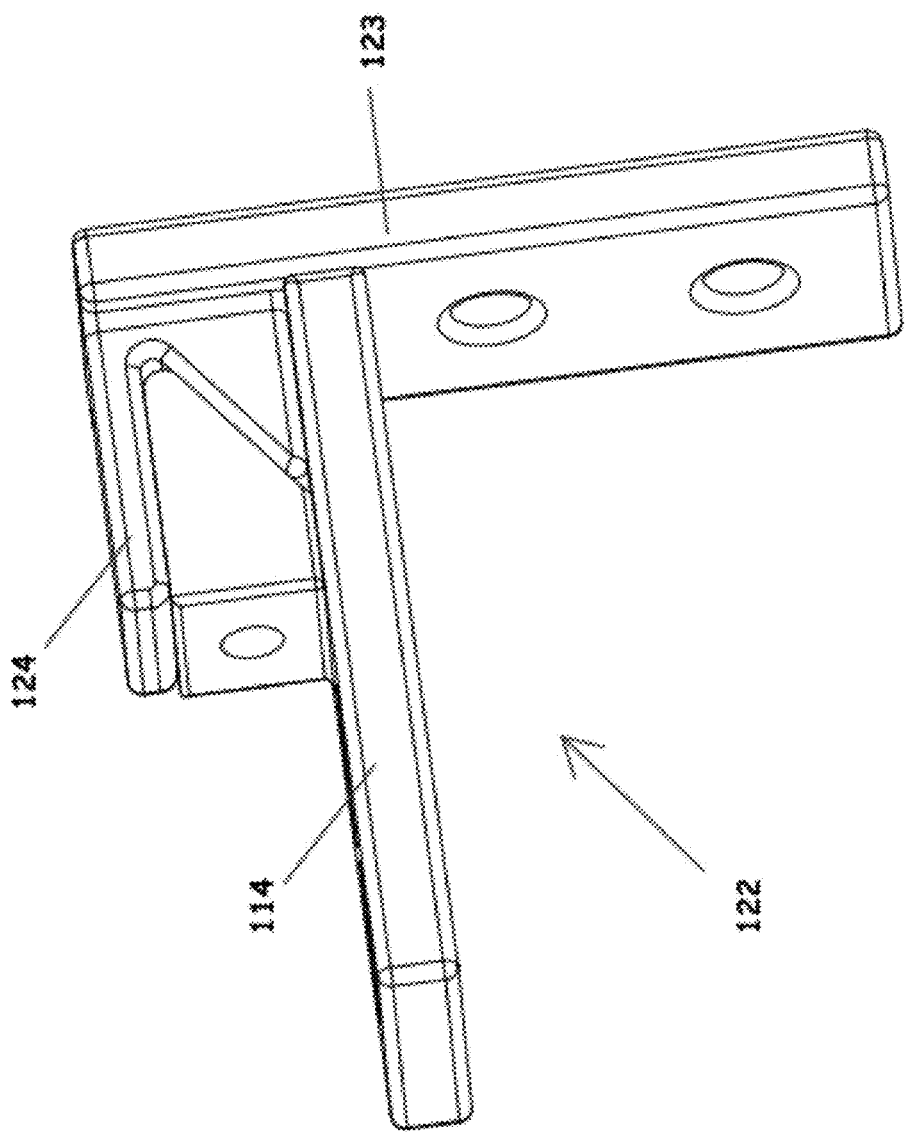
FIG. 40 is a perspective view of two connector members interlocked together according to a sixth embodiment of the present invention.
Figure 41:
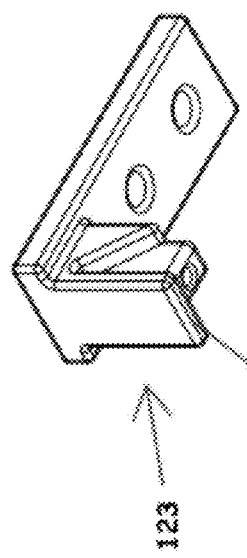
FIG. 41 is a perspective view of one of the connector members used in the connector system shown in FIG. 40.
Figure 42:
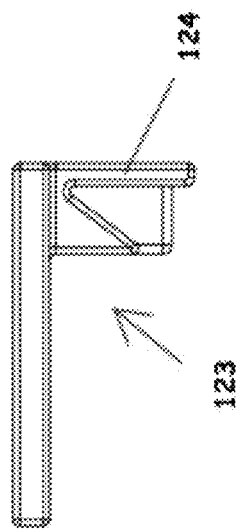
FIG. 42 is a side view of the connector member shown in FIG. 41.
Figure 43:
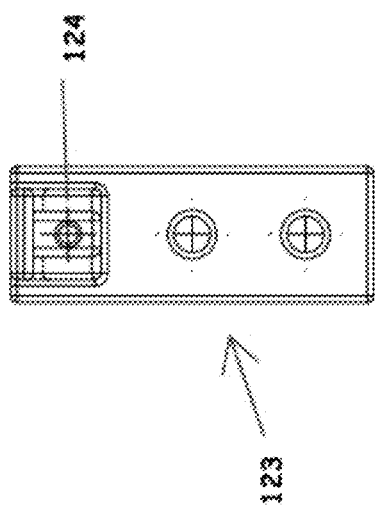
FIG. 43 is a plan view of the connector member shown in FIG. 41.
Figure 44:
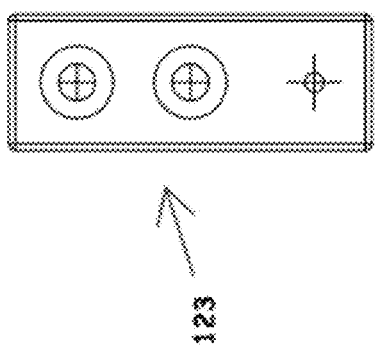
FIG. 44 is a bottom plan view of the connector member shown in FIG. 41.

The first and second connector members 51, 52 can be interlocked together, as shown in FIG. 16, by mating the alignment structure 53 of the first connector member 51 and the receiver structure 54 of the second connector member 52. The first and second connector members 51, 52 are mated by aligning the alignment 53 and receiver structures 54, and then moving the first and second connector members 51, 52 into engagement with each other. The relative movement between the first and second connector members 51, 52 causes the first pair of inclined surfaces 60, 61 of the first connector member 51 to wedge against the second pair of inclined surfaces 73, 74 of the second connector member 52.

The threaded fastener (not shown) is inserted through the bore 81 in the end wall 80 of the receiver structure 54 into the bore 66 in the end wall 65 of the alignment structure 53. The threaded fastener (not shown) is used to draw the connector members 51, 52 together to create a tight connection.

When assembled, the mounting surfaces 56, 71 of the first and second connector members 51, 52 are substantially coplanar. Thus, the connector system 50 of this embodiment can be used to secure two objects together having coplanar surfaces, such as multiple sections of a tabletop or desktop or multiple panels of a wall.

An interlocking connector system 90 according to a fourth embodiment is shown in FIGS. 26 to 30. The connector system 90 of this embodiment uses the second connector member 52 described above in connection with the second embodiment, together with a connector member 91 shown in FIGS. 27 to 30, which has many of the same features as the first connector member 51 of the second embodiment. However, the connector member 91 shown in FIGS. 27 to 30 is made to attach two objects having generally perpendicular mounting surfaces.

The connector system 90 includes a first connector member 91 (FIGS. 27 to 30) and a second connector member 52 (FIGS. 17 to 21) that can each be mounted to separate objects and then interlocked to attach the two objects together. The first connector member 91 has an alignment structure 92, while the second connector member 52 has a receiver structure 54 as described above.

The first connector member 91 has a body 93 with a substantially flat mounting structure 94 on a backside that defines a mounting surface for engaging an object on which the first connector member 91 is mounted. At least one, and preferably a plurality of, mounting openings 95 are provided in the body 93 for receiving threaded fasteners or the like (not shown) to secure the first connector member 91 to the object.

The alignment structure 92 on the first connector member 91 has a projection 97 positioned between a first pair of inclined surfaces 98, 99. The projection 97 is a generally rectangular prism-shaped element formed integral with and extending generally perpendicular from the mounting structure 94. The projection 97 has a pair of substantially parallel outer sidewalls 100, 101, a generally flat wall 102 extending between the sidewalls 100, 101, and a front end wall 103. A bore 104 is formed through the end wall 103 for receiving a threaded fastener (not shown).

The first pair of inclined surfaces 98, 99 are located adjacent to and outside of the respective outer sidewalls 100, 101 of the projection 97. The inclined surfaces 98, 99 each lie in a plane that extends generally perpendicular to the sidewalls 100, 101 of the projection 97. The inclined surfaces 98, 99 are sloped downwardly and rearwardly to form a wedge-shaped opening 106 between the inclined surfaces 98, 99 and a surface 107 of the body 93 adjacent to the projection 97.

The first and second connector members 91, 52 can be interlocked together, as shown in FIG. 26, by mating the alignment structure 97 of the first connector member 91 and the receiver structure 54 of the second connector member 52. The first and second connector members 91, 52 are mated by aligning the alignment structure 92 and the receiver structure 54, and then moving the first and second connector members 91, 52 into engagement with each other. The relative movement between the first and second connector members 91, 52 causes the first pair of inclined surfaces 98, 99 of the first connector member 91 to wedge against the second pair of inclined surfaces 73, 74 of the second connector member 52.

The threaded fastener (not shown) is inserted through the bore 81 in the end wall 80 of the receiver structure 54 into the bore 104 in the end wall 103 of the alignment structure 92. The threaded fastener (not shown) is used to draw the connector members 91, 52 together to create a tight connection.

When assembled, the mounting surfaces 94, 71 of the first and second connector members 91, 52 are substantially perpendicular. Thus, the connector system 90 of this embodiment can be used to secure two objects together having perpendicular surfaces, such as shelves, cabinets, desks, and the like.

An interlocking connector system 110 according to a fifth embodiment is shown in FIGS. 31 to 39. The connector system 110 of this embodiment is similar in many respects to the connector system 90 of the fourth embodiment described above and shown in FIGS. 26 to 30. However, the mounting structures 111, 112 for the first and second connector members 113, 114 are different in the connector system 110. Specifically, the mounting structures 111, 112 in the connector system 110 are arranged in line with each other to give the connector system 110 a narrower profile. The narrower profile makes the connector system 110 better suited for some applications where space is limited.

A pair of mounting openings 115 are located at one end of the body 116 of the first connector member 113, and the alignment structure 117 is located at the other end. Similarly, a pair of mounting openings 118 are located at one end of the body 119 of the second connector member 114, and the receiver structure 120 is located at the other end. The other elements of the connector system 110 are substantially the same as the corresponding elements in the other embodiments described above.

An interlocking connector system 122 according to a sixth embodiment is shown in FIGS. 40 to 44. The connector system 122 of this embodiment is similar in many respects to the connector system 110 of the fifth embodiment described above and shown in FIGS. 31 to 39. However, the first connector member 123 is made differently to allow the connector system 122 to fit over an outside corner when fastening two objects together. Specifically, the alignment structure 124 on the first connector member 123 in the connector system 122 faces the opposite direction from the alignment structure 117 on the first connector member 113 in the connector system 110. The second connector member 114 is the same in the connector system 122 as in the connector system 110.

An interlocking connector system 130 according to a seventh embodiment is shown in FIGS. 45 to 50. The connector system 130 of this embodiment is similar in many respects to the connector systems 110 and 122 of the fifth and sixth embodiments described above and shown in FIGS. 31 to 39 and 40 to 44. However, the first connector member 131 is made differently to allow the connector system 130 to attach two generally coplanar objects together. Specifically, the alignment structure 132 on the first connector member 131 in the connector system 130 is generally parallel to the mounting surface 133 of the connector member 131, instead of perpendicular to the mounting surface as in the connector systems 110 and 122. The second connector member 114 is the same in the connector system 130 as in the connector systems 110 and 122.

While the invention has been described in connection with specific embodiments thereof, it is to be understood that this is by way of illustration and not of limitation, and the scope of the appended claims should be construed as broadly as the prior art will permit.

What is claimed is:

1. An interlocking connector system comprising:
a first item;
a second item to be connected to said first item;
a first connector member, said first connector member comprising:
   a first platform, said first platform including a first mounting surface and a plurality of mounting openings extending from said first mounting surface to a first inner surface of said first platform opposite said first mounting surface, said mounting openings being adapted for mounting said first connector member to said first item, and
   an alignment structure protruding from said first inner surface, said alignment structure comprising a rectangular prism-shaped projection, said projection comprising a pair of substantially parallel outer sidewalls, said alignment structure further comprising a first pair of inclined surfaces, each respective inclined surface of said first pair of inclined surfaces being located adjacent to and outside of a respective one of said outer sidewalls of said projection, and extending in a first plane generally perpendicular to said outer sidewalls, with said first plane forming a non-orthogonal angle with said first inner surface;
a second connector member, said second connector member comprising:
   a second platform, said second platform including a second mounting surface and a plurality of mounting openings extending from said second mounting surface to a second inner surface opposite said second mounting surface, said mounting openings being adapted for mounting said second connector member to said second item, and
   a receiver structure protruding from said second inner surface, said receiver structure comprising a pair of substantially parallel inner sidewalls, wherein said inner sidewalls are arranged to engage said outer sidewalls of said projection when said first connector member is mated with said second connector member, said inner sidewalls being connected by an end wall comprising a through-bore, wherein said receiver structure further comprises a second pair of inclined surfaces, each respective inclined surface of said second pair of inclined surfaces being located adjacent to and outside of a respective one of said inner sidewalls and extending in a second plane generally perpendicular to said inner sidewalls, with said second plane forming a non-orthogonal angle with said second inner surface, wherein said second pair of inclined surfaces is arranged to engage said first pair of inclined surfaces when said first connector member is mated with said second connector member; and a threaded fastener, said fastener being inserted through said through-bore of said second connector member and threadingly engaged with said projection of said first connector member;

wherein tightening of said fastener draws said first and second connector members together in a substantially linear direction such that said outer sidewalls of said projection engage with said inner sidewalls of said receiver structure, and said first pair of inclined surfaces wedge against said second pair of inclined surfaces, thereby rigidly locking said first connector member to said second connector member; and wherein a plurality of fasteners are inserted through each of said pluralities of mounting openings in said first platform and said second platform to rigidly fasten said first mounting surface to said first item and said second mounting surface to said second item, respectively, such that said first and second items are non-rotatable with respect to said first and second connector members, respectively.

2. The interlocking connector system according to claim 1, wherein said first and second mounting surfaces are arranged to be substantially perpendicular when said first and second connector members are assembled together.

3. The interlocking connector system according to claim 1, wherein said first and second mounting surfaces are arranged to be substantially parallel when said first and second connector members are assembled together.

4. The interlocking connector system according to claim 1, wherein said first and second mounting surfaces are arranged to be substantially coplanar when said first and second connector members are assembled together.

5. The interlocking connector system according to claim 1, wherein said alignment structure further comprises a top wall extending between the outer sidewalls, and said first pair of inclined surfaces are formed integral with each side of said projection.

6. The interlocking connector system according to claim 1, wherein said second pair of inclined surfaces are formed integral with said inner sidewalls.

7. An interlocking connector system comprising:
a first item;
a second item to be connected to said first item;
first and second connector members, said first connector member being substantially identical to said second connector member, each of said first and second connector members comprising an elongate body, said elongate body including a first end and an opposing second end, each of said connector members further comprising an alignment structure protruding from an inner surface of said elongate body adjacent said first end, and a receiver structure protruding from said inner surface adjacent said second end, said elongate body further comprising a mounting surface opposite said inner surface, wherein a plurality of mounting openings extend through said elongate body from said inner surface to said mounting surface between said first and second ends, wherein said alignment structure comprises a rectangular prism-shaped projection, said projection comprising a pair of substantially parallel outer sidewalls, said alignment structure further comprising a first pair of inclined surfaces, each respective inclined surface of said first pair of inclined surfaces being located adjacent to and outside of a respective one of said outer sidewalls of said projection, and extending in a first plane generally perpendicular to said outer sidewalls, with said first plane forming a non-orthogonal angle with said first inner surface; and wherein said receiver structure comprises a pair of substantially parallel inner sidewalls, said inner sidewalls being connected by an end wall comprising a through-bore, wherein said receiver structure further comprises a second pair of inclined surfaces, each respective inclined surface of said second pair of inclined surfaces being located adjacent to and outside of a respective one of said inner sidewalls and extending in a second plane generally perpendicular to said inner sidewalls, with said second plane forming a non-orthogonal angle with said inner surface; and wherein the first connector member is mated with the second connector member by moving the first connector member in a substantially linear direction relative to the second connector member in such a manner as to engage both the outer sidewalls and the first pair of inclined surfaces of the alignment structure of the first connector member with the inner sidewalls and the second pair of inclined surfaces, respectively, of the receiver structure of the second connector member while simultaneously engaging the outer sidewalls and the first pair of inclined surfaces of the alignment structure of the second connector member with the inner sidewalls and the second pair of inclined surfaces, respectively, of the receiver structure of the first connector member; and wherein the first connector member is rigidly locked to the second connector member by inserting a threaded fastener through at least one of the respective through-bores of the first and second connector members and threadingly engaging said fastener with the respective projection of the first and second connector members, whereby tightening of the respective fastener draws the first and second pairs of inclined surfaces of the first connector member to wedge against the second and first pairs of inclined surfaces, respectively, of the second connector member; and wherein a plurality of fasteners are inserted through each of said pluralities of mounting openings in the elongate bodies of the first and second connector members to rigidly fasten the mounting surface of the first connector member to the first item and the mounting surface of the second connector member to the second item such that said first and second items are non-rotatable with respect to the first and second connector members, respectively.

8. The interlocking connector system according to claim 7, wherein said elongate bodies of the first and second connector members' mounting surfaces are substantially parallel with each other when said first and second connector members are assembled together.

* * * * *